United States Patent Office 3,488,254
Patented Jan. 6, 1970

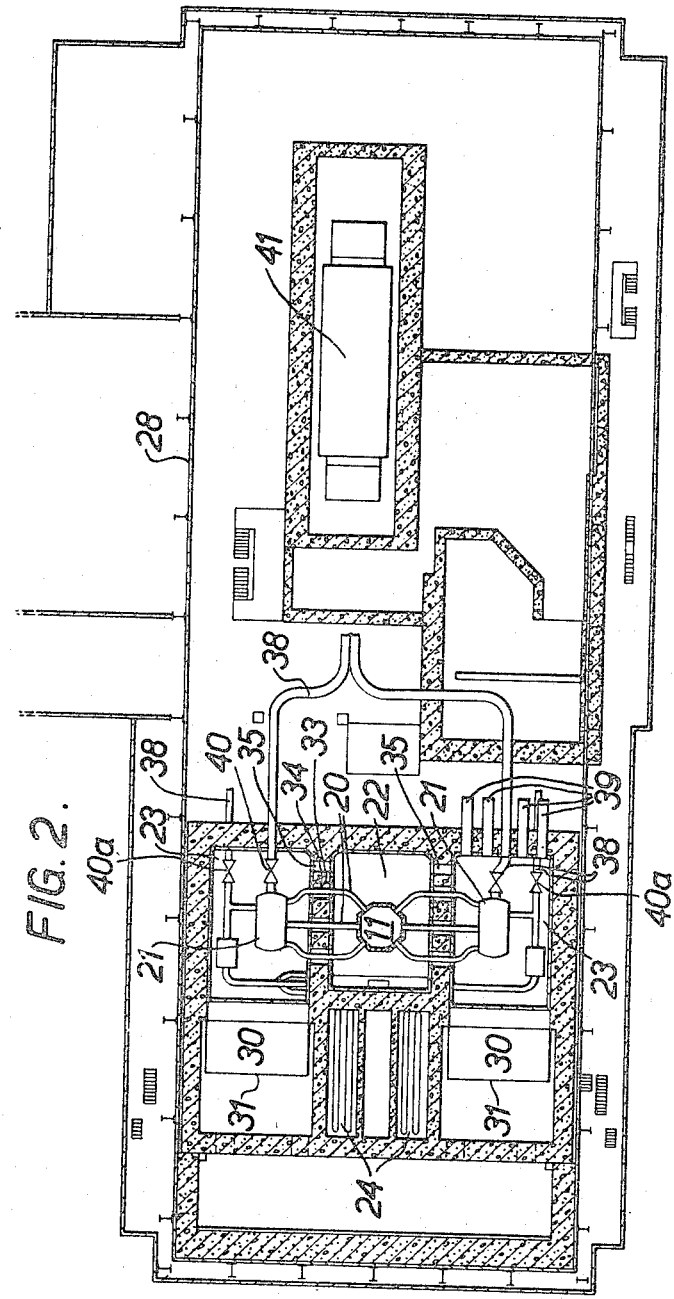

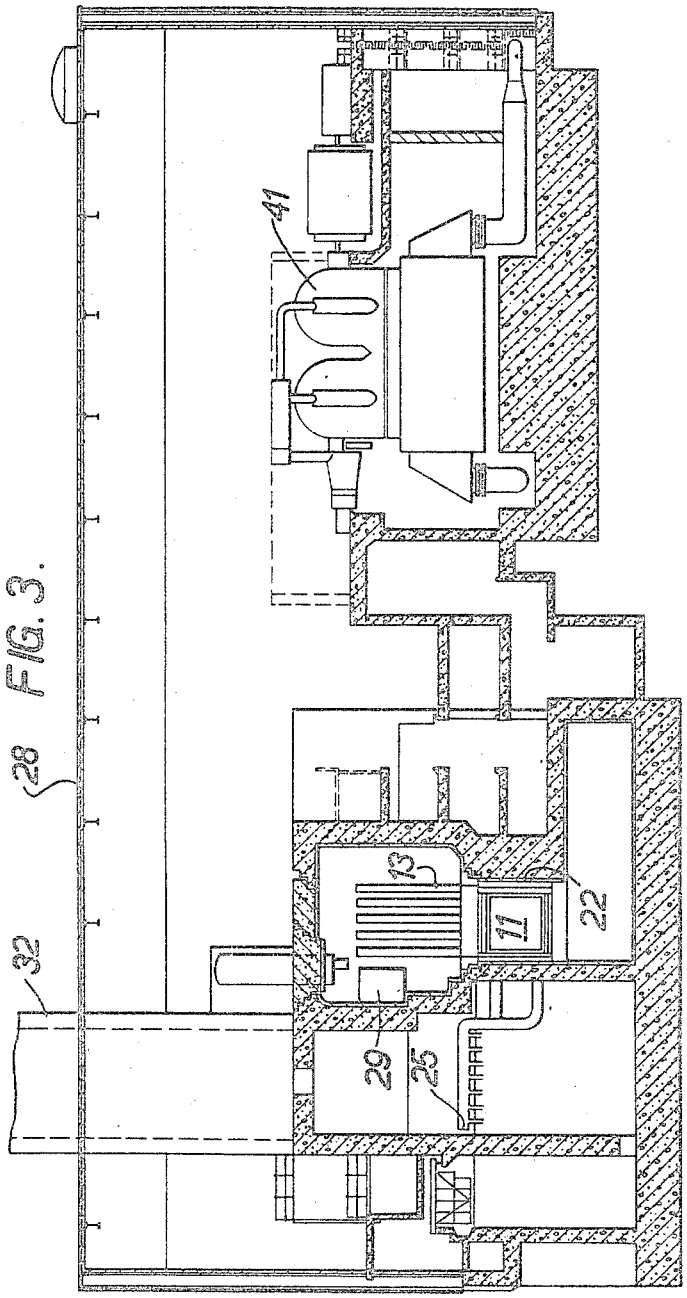

3,488,254
CONTAINMENT ARRANGEMENT FOR WATER COOLED NUCLEAR REACTOR INSTALLATION
Wesley Pearce Davey, Culcheth, and Thomas Elliott Burnup, Altrincham, England, assignors to United Kingdom Atomic Energy Authority, London, England
Filed Apr. 17, 1967, Ser. No. 631,407
Claims priority, application Great Britain, Apr. 28, 1966, 18,768/66
Int. Cl. G21c 13/00, 15/00
U.S. Cl. 176—37                                    2 Claims

ABSTRACT OF THE DISCLOSURE

In a reactor with a pressure suppression device, a baffle limits the flow into the pressure suppression device so that excess flow is directed through an over-pressure-blow-off valve set to a higher pressure than is needed for the pressure suppression device. In a water tube reactor, the baffle divides the primary containment so that any faults in the core which are limited in size by the construction of the core are vented directly through the pressure suppression device but so that faults in other places likely to cause excess flow are separated by the baffle from the pressure suppression device and are vented directly to atmosphere through said valve. Any radioactive pollution occurs in small flows so that excess flows can be safely discharged.

---

The present invention concerns nuclear reactor containments.

The safety of nuclear reactors is ensured by the design of the reactor, by rigorous inspection and specification of materials by engineered safeguards and ultimately by enclosing the reactor in a sealed containment.

Part of the design effort in constructing nuclear reactors is devoted to considering whether each safeguard could cope with the worst feasible incidents independently of other safeguards. The present invention derives from investigations to confirm that the containment is adequate to retain nuclear fission products assuming that there is a failure in the reactor and that this failure has been allowed to reach such proportions as will cause the emission of fission products.

The invention is particularly concerned with water cooled reactors. In such reactors, hot pressurised water coolant contained in a cooling circuit of the reactor if released to atmospheric pressure as by a failure of a component could flash over into large amounts of steam. This loss of coolant may, if all the other safety devices are inoperative, be followed by dangerous emission of fission products and therefore there is a need for a containment to ensure that these fission products cannot escape.

Some putative reactors are in fact wholly contained in a sealed containment capable of withstanding the maximum pressure of steam evolved because of a failure but commonly the pressure of steam is reduced by cooling the steam by passing it through a pressure suppression device such as a pool of water. To ensure the steam passes through the water it is necessary to have an inner or primary containment which is vented through the pressure suppression device. In addition there is an outer or secondary containment to retain any non-condensible fission products and it is the secondary containment which forms the ultimate safeguard and whose integrity can be improved by the practice of the invention.

The safety of the reactor can be improved if this secondary containment does not have to withstand great pressures caused by release of steam but only the smaller pressure occurring during any subsequent release of fission products and various means have been proposed to discharge high steam pressures evolved before fission product release to atmosphere. However these have all relied on venting the steam to atmosphere after it has passed through the pressure suppression device which has therefore been committed to deal with vast quantities of steam before facing the commitment of dealing with fission products. Moreover the impedance to flow caused by the pressure suppression device, would feasibly lead to very high pressures in the primary containment with a risk of it failing.

According to one aspect of the present invention a nuclear reactor having a primary containment, a pressure suppression device and a fission product retaining secondary containment has a baffle disposed to restrict any flow into the pressure suppression device and an over-pressure blow-off valve leading from the primary containment set so that any pressure in the primary containment caused by steam evolution is limited to a safe value by release direct to atmosphere but gases at lower pressures are constrained to flow through the pressure suppression device.

A nuclear reactor according to another aspect of the present invention in which any leakage from a part of a pressurised water circuit is limited by the construction of said part but is likely to result in noxious vapours or vapour-gas mixtures, has said part of the circuit within a first primary containment which is vented (into a secondary containment) through a pressure suppression device, and any other part of the circuit wherein any leakage may result in a large volume of vapour contained within a second primary containment which is vented to atmosphere through one or more blow-off valves set to a blow-off pressure greater than that needed to drive vapour through the pressure suppression device, the second primary containment being connected with the first primary containment through apertures that limit the flow from the second primary containment to a rate acceptable to the pressure suppression device.

For example a pressure tube type of water reactor is constructed with 5 inch diameter pressure tubes and it is beyond the bounds of possibility that more than a certain number of these tubes would rupture during one incident because a missile would not have enough energy to cut more than one tube and the feasibility of further propagation of a fault is negligible. Therefore the maximum leakage to be allowed for from the pressure tubes is limited to the amount being pumped along a reasonable number of these five-inch diameter pressure tubes. However, failure of a pressure tube may cause stagnation of the coolant therein or the complete coolant voiding of the tube and if nuclear fuel within the pressure tube is not adequately cooled by emergency cooling it may release fission products. These fission products are in the form of noxious gases. Therefore the core must for ultimate safety be treated as if it can release a modest amount of steam followed by the emission of fission products probably mixed with further steam.

However connected in the coolant circuit there are also two steam drums which can be 90 inches in diameter and twenty six feet long whose failure would release vast amounts of steam. The coolant circuit moreover comprises pipes of up to say 13½ inch diameter and pumps for returning water back into the pressure tubes and pipes connecting the pressure tubes to the steam drum as well as a steam utilisation circuit (drawing steam from the drum and returning the condensed steam back into the water circuit).

With such a reactor the core would be in the first primary containment and the drums in the second primary containments along with the pumps; care would be taken so that all pipes in the first primary containment would be too small to permit an overlarge failure therein.

There is a possibility of a leak in the pipes leading from the pressure tubes to the steam header in the second primary containment which would result in a failure of the same order as those in the first primary containment and such a leak may also result in stagnation of coolant and the release of fission products (through the leak path) of the same order as occurred within the first primary containment. However there is also a possibility of a large leak from the drums of elsewhere which would cause the release of vast amounts of steam and subsequently, but on a longer time-scale than is the case with the smaller leaks discussed above, say after 20 seconds, release of fission products. The vast amounts of steam would be evolved however long before any fission product release although there may be a continuing small leak. If a small leak occurs then it is discharged through the pressure suppression device but if a larger leak occurs then the pressure surge resulting therefrom is clipped with a major part of the initial release being discharged to atmosphere directly. If the blow-off valve is self re-sealing when the pressure drops, and in a preferred embodiment it is, any continuing steam release and any fission products would be discharged through the pressure suppression device.

The steam utilisation circuit deals with comparatively small weights of steam compared to the weight of water circulating in the main coolant circuit and so the steam utilisation circuit outside of either containment can be protected by conventional excess flow valves and slave valves or otherwise.

Whereas in the past pressure suppression devices all emissions of steam and fission products were passed into the pressure suppression device, the preferred embodiment of the present invention by-passes any vast release of steam to atmosphere but ensures all fission products pass through the pressure suppression device. This gives three advantages; the pressure within the primary containments is limited, the pressure suppression device is not heavily committed to deal with a vast steam release prior to having to deal with fission products so that the safety margin is thereby enhanced and finally any transients resulting from a vast release of steam are severely attenuated before they reach the secondary containment so the safety margin of the secondary containment is also increased.

An embodiment of the invention will now be described with reference to the drawings in which FIGURE 1 is a diagrammatic elevational cross section of a core of a water cooled pressure tube reactor.

FIGURE 2 is a section in plan through a nuclear power station and

FIGURE 3 is an elevational section along the line 3—3 of FIGURE 2.

Figure 1:
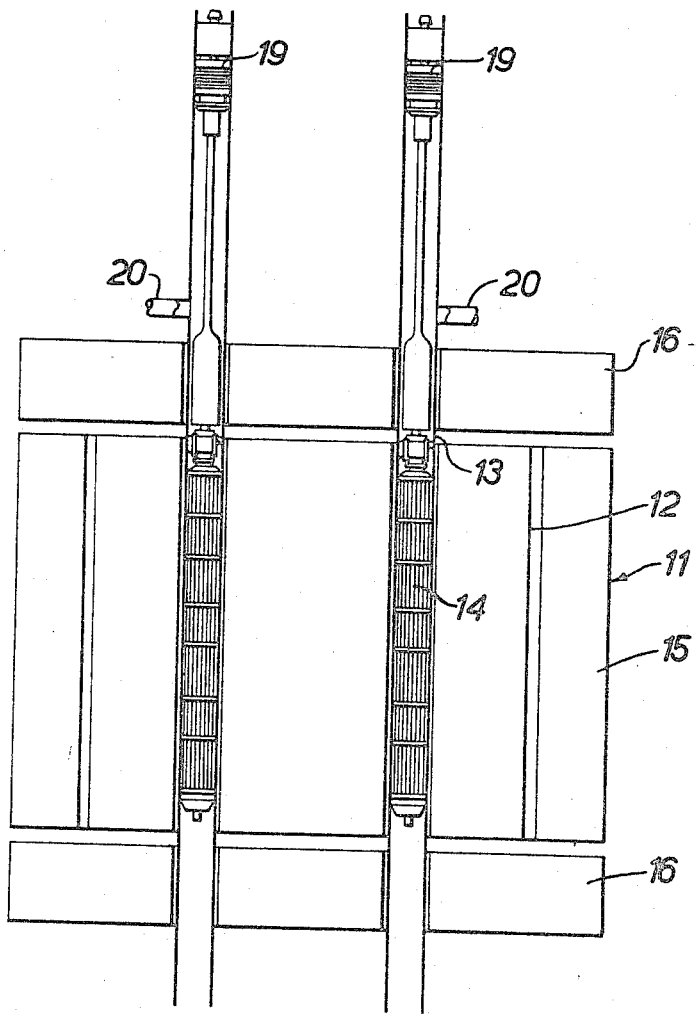

Turning first to FIGURE 1, a nuclear reactor core 11 comprises a heavy water filled calandria 12 penetrated by pressure tubes 13 which contain nuclear fuel elements 14 cooled by a flow of natural water along the pressure tubes 13. Neutron shielding material 15 surrounds the core and further neutron shielding material 16 is provided above and below the core. The pressure tubes at their upper ends form standpipes which are sealed at their upper ends by seal plugs 19.

Connections 20 lead from the pressure tubes to header drums 21 which constitute part of the reactor coolant circuit plant. The core 11 is contained within a first primary sub-containment 22 (FIGURE 2) and the drums are contained within further or second primary sub-containments 23. The primary sub-containment 22 is vented through a pressure suppression device 24 which is designed to cope with the maximum feasible failure within the core say the complete rupture of two of the pressure tubes which could for example be five inches in diameter. The pressure suppression device comprises a pond of water 25 within a secondary containment 28. This containment 28 could be the turbine hall. The pressure suppression device may be equipped with means to permit the release to atmosphere of the initial release of steam prior to fission-product emission, The sub-containments 23 are interconnected by low impedance ducts 29 so that the volume of all the sub-containments 23 is available in case of a failure within any one of them. These sub-containments 23 are vented by a low impedance flow path to atmosphere through a self resealing relief valve such as a dip pipe 30 in a further pond 31, which valve is adapted to release transient pressures in excess of 15 pounds per square inch gauge as might occur if a header drum were to fail, through an atmospheric discharge stack 32. The discharge stacks 32 constitute barrier means defining ducts providing communication between the interiors of the sub-containments 23 and the atmosphere and excluding communication between the sub-containments 23 and the secondary containment by way of the ducts. It is noted that the 15 pounds per square inch value compares with a value of say 10 pounds per square inch gauge necessary for vapour to pass through the pressure suppression device 24.

Most of the parts that make up the main coolant conducting plant but excluding the reactor that is the pressure tubes header drums, pumps and their interconnections are in one or other of the primary sub-containments which are adjacent to one another, each sub-containment 23 sharing a common dividing wall 33 with the sub-containment 22. The wall 33 serves also as a baffle.

Where the connections 20 pass through the dividing walls 33 they do so through clearance apertures 34. Additional apertures 35 may also be provided preferably sealed by unidirectional rupture discs arranged to pass vapour into the primary sub-containment 22. The aggregate cross section of the clearances and the additional apertures 35 may be say 130 square feet to pass a flow of 80,000 cubic feet of vapour at a pressure difference of 10 pounds per square inch. This flow tends to be self choking by sonic velocity effects and will not exceed 90,000 cubic feet no matter how much the pressure difference exceeds ten pounds per square inch.

The walls of the primary sub-containments 22 and 23 are designed to withstand any fragments, resulting from explosive rupture of the circuit and to withstand pressures of say 20 pounds per square inch with sufficient margin to cope with transients. However the walls have to be substantial in any case to provide biological shielding.

There are of course the usual provisions such as a steam circuit 38 for withdrawal and utilisation of the steam in a turbine 41, such as emergency spray cooling (not shown) and such as recirculatory decontamination filtration circuits indicated at 39. These include the usual components such as excess flow isolation valves 40 and valves 40a slaved to such excess flow valves to prevent serious loss of steam.

We claim:

1. A nuclear reactor installation comprising a water cooled nuclear reactor and a coolant conducting plant therefor, a primary containment divided by a wall into at least two primary sub-containments, a first sub-containment housing said nuclear reactor and a second sub-containment housing coolant conducting plant, a fission product retaining secondary containment enclosing said primary containment, a pressure suppression device within said secondary containment for condensing steam passing from said first primary sub-containment, barrier means defining a duct for providing communication between the interior of said second primary sub-containment and the atmosphere outside of said secondary containment, said barrier means excluding communication between said second primary sub-containment and said secondary containment by way of said duct, a normally closed relief valve for controlling fluid flow through said duct including means for enabling opening of said relief valve when the pressure within said second primary sub-containment is greater than a selected value, said value being greater than that of the pressure required to effect discharge through the pressure suppression device, and fluid flow duct means for providing intercommunication between said sub-containments.

2. A nuclear reactor installation according to claim 1, wherein said fluid flow duct means comprises apertures defined by said wall, said installation further including at least one unidirectional rupture disc located in an interconnection between the sub-containments, said disc being rupturable responsive to the pressure in the secondary sub-containment becoming in excess of the pressure in the first sub-containment.

References Cited

UNITED STATES PATENTS

| 3,301,761 | 1/1967 | Johnson et al. | 176—37 |
| 3,321,374 | 5/1967 | Windle et al. | 176—37 |

FOREIGN PATENTS

| 862,624 | 3/1961 | Great Britain. |
| 938,190 | 10/1963 | Great Britain. |

OTHER REFERENCES

Power React. Technology, vol. 5, No. 1, December 1961, pp. 33–36.

CARL D. QUARFORTH, Primary Examiner

HARVEY E. BEHREND, Assistant Examiner

U.S. Cl. X.R.

176—38